US007745740B2

(12) United States Patent
Smith

(10) Patent No.: US 7,745,740 B2
(45) Date of Patent: Jun. 29, 2010

(54) WIRE/CABLE IDENTIFICATION DEVICE

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 392 days.

(21) Appl. No.: 11/999,081

(22) Filed: Dec. 4, 2007

(65) Prior Publication Data

US 2009/0139743 A1 Jun. 4, 2009

(51) Int. Cl.
*H02G 3/18* (2006.01)

(52) U.S. Cl. ...................... 174/650; 174/653; 174/668; 174/112

(58) Field of Classification Search ............. 174/102 R, 174/108, 109, 110 R, 112, 650, 653, 655, 174/659, 668, 74 R, 77 R, 93, 94 R; 156/50, 156/51, 52; 248/56
See application file for complete search history.

(56) References Cited

U.S. PATENT DOCUMENTS

| | | | | | |
|---|---|---|---|---|---|
| 2,629,953 | A | * | 2/1953 | Safka et al. | 40/662 |
| 3,212,207 | A | * | 10/1965 | Searing | 40/316 |
| 3,474,559 | A | * | 10/1969 | Hunt | 40/316 |
| 3,627,904 | A | * | 12/1971 | Milne | 174/83 |
| 3,857,136 | A | * | 12/1974 | Dean | 174/152 R |
| 4,424,627 | A | * | 1/1984 | Tarbox | 29/857 |
| 4,579,759 | A | * | 4/1986 | Breuers | 428/375 |
| 4,609,208 | A | | 9/1986 | Wrobel | 283/81 |
| 4,636,017 | A | * | 1/1987 | Boteler | 439/492 |
| D388,833 | S | | 1/1998 | Wilson | D20/22 |
| 5,862,774 | A | * | 1/1999 | Moss | 116/200 |
| 6,337,115 | B1 | * | 1/2002 | McMahon | 428/36.9 |
| 6,420,657 | B1 | * | 7/2002 | Fang et al. | 174/112 |
| 6,825,418 | B1 | * | 11/2004 | Dollins et al. | 174/112 |
| 6,857,801 | B2 | * | 2/2005 | Van Bever | 400/615.2 |
| 6,923,675 | B2 | * | 8/2005 | Gorin | 439/491 |
| 7,073,282 | B2 | | 7/2006 | Savagian et al. | 40/316 |
| 2002/0062537 | A1 | * | 5/2002 | Boldy | 24/16 R |
| 2002/0189843 | A1 | * | 12/2002 | Ito et al. | 174/72 A |

* cited by examiner

*Primary Examiner*—William H Mayo, III
(74) *Attorney, Agent, or Firm*—Fattibene and Fattibene; Paul A. Fattibene

(57) ABSTRACT

An electric wire identifier that includes an anti-short bushing in the form of an electrical insulating ring-like insert fitted onto the end of a metal or armored clad cable that defines the terminal end of the armored cable or into the end of an electrical connector that is generally inserted through a knock-out hole of an electric box or panel, and which bushing includes an integral extension or surface capable of retaining thereon suitable identifying indicia that is rendered visible throughout the lifetime of the electrical installation. In another form of the invention, the wire identifiers, in the form of a label or tag having a loop attachment that may be arranged in a tree or roll whereby the individual labels or tags can be readily dispensed as needed.

13 Claims, 2 Drawing Sheets

WIRE/CABLE IDENTIFICATION DEVICE

FIELD OF THE INVENTION

This invention relates to identification devices, and more specifically to an electric wire or cable identifier.

BACKGROUND OF THE INVENTION

In the electrical arts, and in particular in areas wherein electrical wires and/or cables are being installed in buildings and/or in other installations requiring numerous terminals and/or wires or cables to be installed at remote locations, considerable difficulties have been encountered in the order and/or to what circuit a given wire or cable is to be connected. Generally, it was the installer's practice to mark a given wire or cable in a makeshift manner with whatever means available by which the installer could identify which wire or cable was to be connected to a particular circuit or terminal. Thus, each installer would create his or her own personal identification arrangement which, over time, may fade or disappear. The difficulty encountered with such practice rendered such identification ineffective in the event another installer or electrician would later be required to complete, repair and/or alter a given wiring installation, e.g. in a residential or commercial building.

In the event of new construction, the identification of the wires or cables would, in the course of construction, be covered over by the finished wall causing the terminal ending of a given wire or cable to be unmarked. In the event any repairs at some future time were required, considerable difficulties have been encountered in determining which wire or cable is causing a circuit or an electric appliance to malfunction.

One such effect to alleviate this long standing problem is evidenced by U.S. Pat. No. 4,609,208, which discloses a pad of labels in the form of pressure sensitive labels having a release liner wherein the labels are preprinted with a series of repeated numerals. The respective labels are so formed so as to be readily peeled off from the pad, released from its liner and wrapped about a wire to be identified. Such labels have limited application in that in a finished construction, the labels would not be visible as the label would be within a closed wall or behind a junction box or panel.

Another known effort is evidenced by U.S. Pat. No. 7,063,282 B2 which discloses a "clip on" type of marker that includes an elongated oval configuration having a hole formed in the opposed ends of the elongated oval configuration whereby the holes are each provided with a cut or slit for enabling the marker to be clipped onto a wire. An apparent disadvantage of a "clip on" type tag or marker is that over time, such "clip on" markers are prone to also "clip off", causing the associated wire to lose its identification.

SUMMARY OF THE INVENTION

An object of this invention is to provide an identification system for identifying a wire or cable which is rendered visible from inside of an electrical junction box or panel.

Another object is to provide a wire identification arrangement integrally formed as a component part of an anti-short bushing inserted in the exposed end of an armor cable.

Another object is to provide a wire or cable identifier or tag which is provided with a suitable writing surface on which the user may mark with any desirable identification indicia.

Another object is to provide for a plurality of wire identification devices in an arrangement whereby the individual identification devices can be readily dispensed as needed.

Another object is to provide a wire identification tag or marker arranged in a manner to prohibit separation of the identification tag or marker from its associated wire.

Another object is to provide a wire identification tag or marker which is non-conducting and which is highly visible.

Another object is to provide a wire identifier which can be positively secured to an associated wire or cable without the need of any adhesive.

Another object is to provide a wire identifier which is relatively simple in structure, easy to produce and positive in operation.

The foregoing objects, features and advantages are obtained by a wire identification device which is associated with an electric wire or cable in a manner that renders the identification device readily visible long after the identified wire or cable has been installed. This is attained by constructing an anti-short bushing in the form of a plastic electrical insulating ring-like insert which is fitted onto the end of a metal or armored clad cable that defines the terminal end of the armor clad cable or an outlet opening of an electric connector that is generally inserted through a knock-out hole of an electric box or panel, e.g. a junction box, wall outlet box, switch box and the like. Such anti-short bushing or insulator sleeve is provided with an integral projecting tab or label having a surface capable of retaining thereon identifying indicia for identifying the wire or cable associated therewith. As the anti-short bushing or insulator sleeve is located at the terminal end of an electrical connector or of the wire or cable disposed within an electric box or panel, it is rendered readily visible whenever any repair, modification or change is required to be made with respect to any circuit associated or controlled by such wire or cable.

In another form of the invention, the wire identification device may be in the form of a plastic label provided with a writing surface on which identifying indicia can be placed. In this form of the invention, the label portion is also integrally formed with an attachment arrangement in the form of a loop whereby the label can be readily attached and permanently secured to the wire or conductor to be identified thereby. The arrangement of the labels in this form of the invention is such that a series of such labels can be integrally connected to one another in the form of a tree or a roll whereby the individual labels may be individually dispensed as needed.

IN THE DRAWINGS

DETAILED DESCRIPTION OF THE PREFERRED EMBODIMENTS

Figure 1:
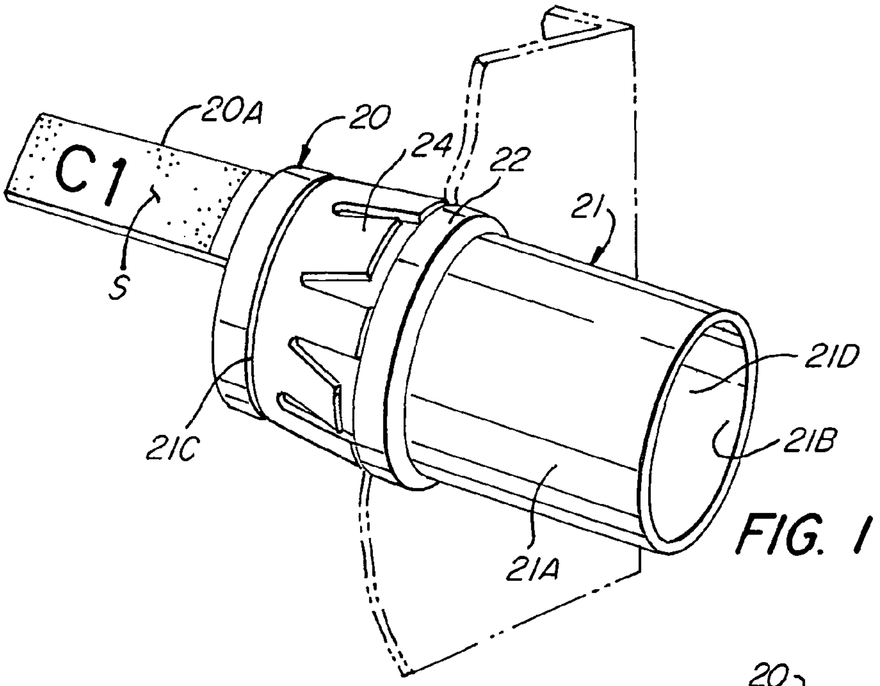
FIG. 1 is a perspective view of an electric wire identifier as applied to a wire or cable connector.
Figure 3:
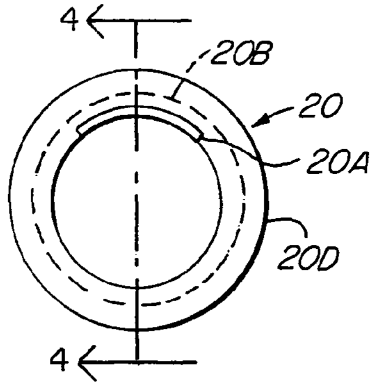
FIG. 3 is a front end view of FIG. 2.
Figure 2:
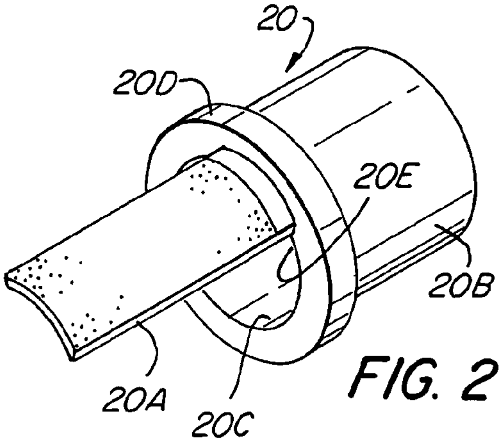
FIG. 2 is a perspective view of a wire identifier embodying the present invention.
Figure 5:
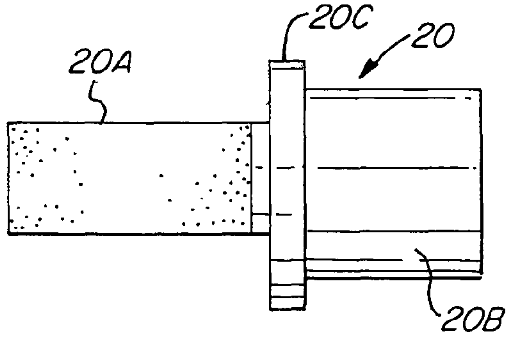
FIG. 5 is a top view of FIG. 4.
Figure 4:
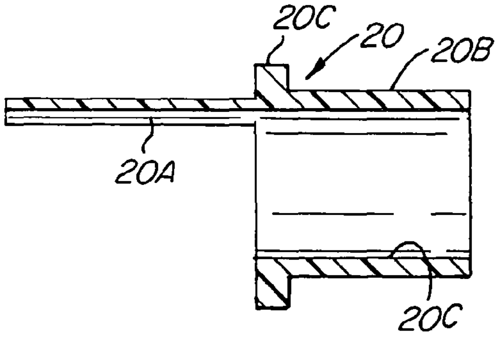
FIG. 4 is a sectional view taken along line 4-4 on FIG. 3.

Referring to the drawings, there is illustrated in FIGS. 1 to 5, a first embodiment of the invention. As shown in FIG. 1, the wire identifier 20 is illustrated as applied to an electrical connector 21 of any standard or known construction. Such electrical connectors generally have a connector body 21A formed with an inlet end portion 21B, an outlet end portion 21C and a bore 21D extending therethrough. Such electrical connectors are arranged to receive a wire conductor, cable or the like as exemplified in U.S. Pat. Nos. 2,744,769; 1,483, 218; 6,555,750 B2, and other patents that are used to connect associated wire conductors or cables to a knock-out hole of an electric box or panel. Generally, the known connectors include a radially outwardly extending flange 22 circumscribing the connector body 21 intermediate the inlet end portion 21B and the outlet end portion 21C to limit the insertion of the connector body through a knock-out hole of an electric box or panel. In the illustrated embodiment, the connector 21 includes a typical circumscribing snap fit retaining ring 24 for securing the connector 21 and associated wire conductors to the electric box or panel as disclosed in the aforementioned patents, which are incorporated herein by reference.

In accordance with this invention, there is provided an anti-short bushing 20 which has integrally formed therewith a wire identified 20A. Referring to FIGS. 2 to 5, the anti-short bushing 20 includes a generally cylindrical body portion 20B having a bore 20C extending therethrough, through which a wire conductor may be extended. The body portion 20B is sized and shaped whereby it may be press fitted into the outlet opening 21C of the connector body 21A. A radially outwardly extending flange 20D circumscribes the outer end opening 20E of the bushing 20.

Connected to the outer end of the bushing 20 and integrally formed thereto is a laterally projecting wire identifier, tag or label 20A. The bushing 20 and the attached wire identifier 20A are preferably formed of a suitable plastic material, e.g. nylon, polypropylene and the like. The surface portion S of the identifier 20A is treated so as to form a writing surface capable of receiving thereon suitable indicia for identifying the associated wire or cable which is extended through the connector body 21 and terminated in the electric box or panel.

With the construction described, it will be readily apparent that the bushing 20 is sized and shaped so that it can be fitted into the outlet opening 21C of the connector body 21 to prohibit any electric shorting between the wire conductor extending therethrough and the metal connector body. In the arrangement described, the projecting identifier, tag or label, which extends into the electric box, can be readily marked with suitable indicia to identify the associated wire conductor, circuit or appliance controlled thereby. The surface S of the identifier, label or tag is formed so that the identifying indicia may be formed with any suitable type of writing instrument, such as a pen, marker, pencil and the like. Since the projecting identifier, label or tag disposed within the electric box or panel is at all times a part of a permanent installation, the identification of the associated wire or conduit will always be known.

Figure 7:
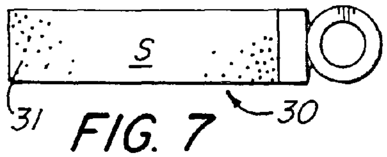
FIG. 7 is a top plan view of FIG. 6.
Figure 8:
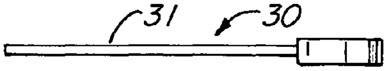
FIG. 8 is a side view of FIG. 7.
Figure 6:
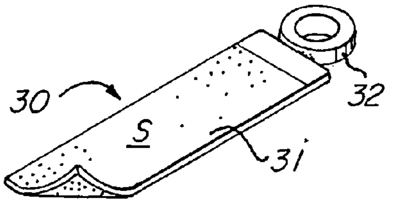
FIG. 6 is a perspective view of another embodiment of the invention.
Figure 9:
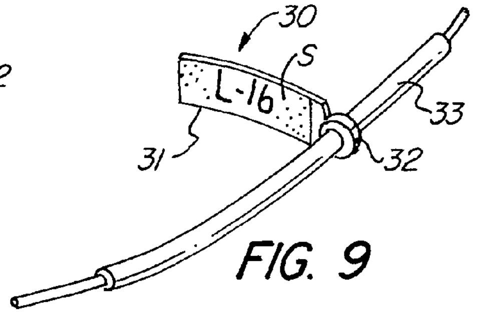
FIG. 9 is a perspective view of the embodiment of FIG. 2 as applied to an associate wire conductor.

FIGS. 7 to 9 illustrate another embodiment of the invention. In this form of the invention, the wire or cable identifier 30 is molded or formed of a suitable plastic material in the form of an elongated tag 31, which is provided with a writing surface S on one or both sides thereof which is capable of retaining thereon, writing indicia as shown in FIG. 9. At one end of the label or tag, there is integrally formed a loop 32 whereby the identifier can be readily threaded onto the length of wire or cable 33 associated thereto.

Figure 11:
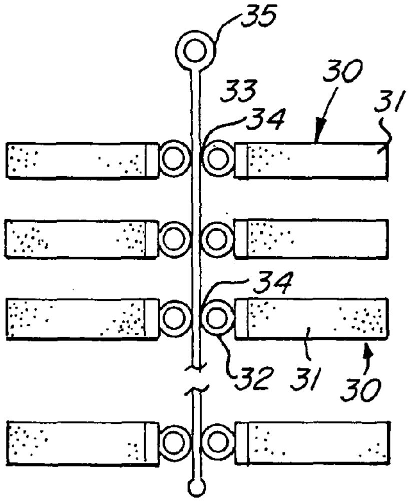
FIG. 11 is an illustration of an arrangement for individually dispensing the wire identifier of FIG. 6.

FIG. 11 illustrates a convenient way of molding the wire identifiers 30 whereby they can be conveniently dispensed one at a time as needed. As shown in FIG. 11, a plurality of wire identifiers 30 as described are integrally molded about a main stem 33. Each of the plurality of wire identifiers is integrally connected to the main stem 33. In the illustrated embodiment, the looped end 32 is connected to the main stem by a readily frangible contact area 34 so that an individual identifier can be readily broken away or separated along the frangible break area. To stow or hang the main stem 33 when not in use, the stem 33 may be provided with a loop end 35.

As the wire identifier is threaded onto the associated wire, it will be readily apparent that the identifier 30 becomes a permanent part of the electrical installation so as to render the associated wire readily identifiable throughout the life of the electrical installation.

Figure 12:
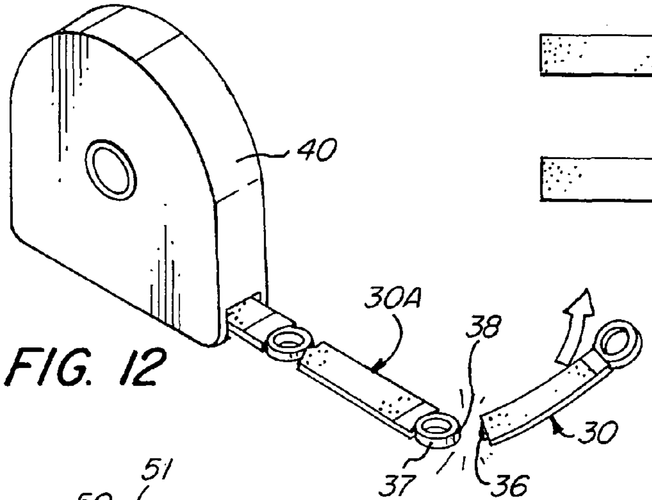
FIG. 12 is another embodiment of a dispensing arrangement of a wire identifier embodying the present invention.

FIG. 12 illustrates another form of the invention for independently dispensing the wire identifier 30 as needed. In this form of the invention, the wire identifiers 30, as hereinbefore described, are integrally molded in consecutive end to end relationship as shown in FIG. 12, which are subsequently rolled into a coil and placed within a housing 40. The arrangement is such that the tail end 36 of wire identifier 30 is connected to the head end 37 of the next adjacent identifier 30A by means of a readily frangible connection 38. In all other respects, the wire identifiers, tags or labels 30 are similar to that hereinbefore described.

Figure 10:
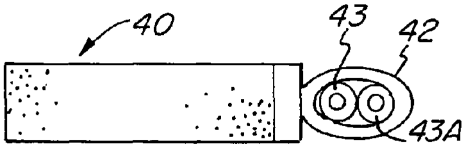
FIG. 10 is a plan view of another modified embodiment of the invention.

FIG. 10 illustrates a slightly modified form of the invention. The wire identifier 41 of FIG. 10 is similar to that of FIG. 7, with the exception that the loop 42 is generally oval in shape and of a size adapted to accommodate two or more associated wire conductors 43, 43A.

Figure 13:
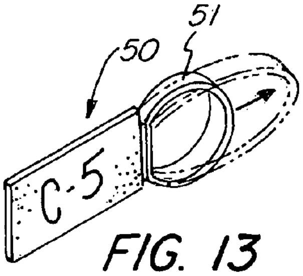
FIG. 13 is a perspective view of still another modified embodiment of a wire identifier.

FIG. 13 illustrates a further embodiment of the invention. In this form of the invention, the wire identifier 50 is similar in structure to that described with respect to FIG. 7, except that loop 51 may be made in varying sizes and/or formed of an elasticmeric material that will enable the loop to stretch so as to accommodate wire conductors or cables having varying diameters within any given range of sizes.

Figure 14:
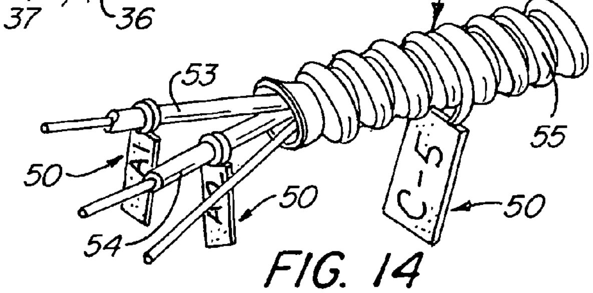
FIG. 14 is a perspective view illustrating an application of the wire identifier embodying the invention.

FIG. 14 illustrates how the wire identifier 50 may be applied to identify a given armored cable 52 as well as identifying the individual wire conductors 53, 54 shielded by the armor sheeting 55.

It will be understood that while the respective wire identifiers herein described can be readily identified by the written or printed indicia applied thereto, as described herein, additional identification may be had by color coding the respective described wire identifier in accordance with any suitably established coloring code.

From the foregoing, the described wire or cable identifiers are durable, non-conducting, and provide high visibility and durability so that the respective wire conductors can be readily identified throughout the life of the wire installation. The permanency of the described wire identifiers alleviates the problems of attempting to identify wire conductors in case repairs and/or replacements are required years after the original installation. The wire identifiers are simply and easy to apply in the field, can be easily fabricated, economic to use and positive in operation.

While the present invention has been described with respect to several embodiments and modifications thereof, it will be understand that other variations may be made without departing from the spirit and scope of the invention.

What is claimed is:

1. In combination with an electrical box or panel having a knock-out hole and an electrical connector adapted to be inserted and secured to the knock-out hole comprising:

a connector body having an inlet end portion, an outlet end portion, and a bore extending therethrough, a radially outwardly extending flange circumscribing said connector body between said inlet end portion and said outlet end portion, a means circumscribing said outlet end portion for retaining said connector body within said knock-out hole, a wire conductor identifier, said wire conductor identifier including a bushing mounted in said outlet end portion of said connector body, said bushing having radially outwardly extending flange circumscribing about one end of said bushing, and a tag projecting outwardly from said one end portion of said bushing, said tag having a surface capable of retaining thereon written identifying indicia thereon for identifying an associated wire conductor terminated in the electric box.

2. In the combination as defined in claim 1 wherein said bushing is formed of a plastic, non-electrical conducting material.

3. A wire conductor identifier comprising:

an anti-shock bushing having a generally cylindrical body, a bore extending through said cylindrical body, a radially outwardly extending flange circumscribing an end portion of said cylindrical body, a tag integrally connected to said end portion, said tag projecting outwardly from said end portion, and said tag having at least one surface thereof capable of retaining therein an identifying indicia.

4. A wire conductor identifier as defined in claim 3 wherein said anti-shock bushing includes an inlet end and an outlet end, said bore extending from said inlet end to said outlet end, said flange circumscribing said outlet end, and said tag having a curvilinear surface capable of retaining the identifying indicia thereon.

5. A wire conductor identifier as defined in claim 4 and having a second surface for retaining an identifying indicia thereon.

6. A wire conductor identifier as defined in claim 4 wherein said bushing being color coded in accordance to a standard color code.

7. An electric wire or cable conductor identifier comprising:

a plastic label having a planar surface portion capable of retaining thereon identifying indicia, and an attachment means connected to at least one end of said planar surface portion, said attachment means comprising a loop adapted to be threaded onto a wire conductor associated therewith.

8. An electric wire or cable conductor identifier as defined in claim 7 wherein said loop is sized to accommodate a single wire conductor.

9. An electric wire or cable conductor identifier as defined in claim 7 wherein said loop is sized to accommodate more than a single wire conductor.

10. An electric wire or cable conductor as defined in claim 7 wherein said loop is elastic so as to accommodate electric wires or cable conductors of variable sizes.

11. A dispenser for dispensing electrical wire or cable identifiers comprising:

a molded plastic elongated stem, and a plurality of electrical wire or cable identifiers integrally molded to said stem, each of said electric wire or cable identifiers including an elongated label having a planar surface portion capable of maintaining thereon identifying indicia, and an attachment means connected to one end of said planar surface portion, said attachment means including a loop adapted for threading said identifier to an associated electric wire or cable to be identified thereby, and means for frangibly connecting each said identifier to said stem whereby each said identifier can be readily separated from said stem as needed.

12. An electric wire or cable label dispensing arrangement comprising:

a series of electric wire or cable identifiers disposed in molded end to end relationship, each of said identifiers including an elongated planar portion, and a connected loop integrally attached to one end of said planar portion, each of said identifiers having a leading end portion and a trailing end portion whereby the trailing end portion of one of said identifiers is joined to the leading end of the next adjacent identifier, said joined ends of said trailing and leading ends of adjacent identifiers defining a readily frangible juncture whereby the leading identifier can be readily separated from said series as needed.

13. An electric wire and cable dispensing arrangement as defined in claim 12 wherein said series of identifiers are coiled in a roll, and a dispenser housing encasing said roll, said dispensing housing having an opening through which the leading identifier can be readily dispensed as needed.

* * * * *